United States Patent [19]
Asai et al.

[11] Patent Number: 5,979,779
[45] Date of Patent: Nov. 9, 1999

[54] AIR CONDITIONING SYSTEM FOR VEHICLE

[75] Inventors: Satoru Asai, Ichinomiya; Yuji Ito, Okazaki, both of Japan

[73] Assignee: Denso Corporation, Kariya, Japan

[21] Appl. No.: 09/008,928

[22] Filed: Jan. 20, 1998

[30] Foreign Application Priority Data

Jan. 20, 1997 [JP] Japan ..................................... 9-007907

[51] Int. Cl.$^6$ .............................. F24F 7/00; G05D 23/00
[52] U.S. Cl. .......................... 236/49.3; 62/179; 236/91 C
[58] Field of Search ................................ 236/49.3, 91 C; 62/179 V; 165/43

[56] References Cited

U.S. PATENT DOCUMENTS 5,340,021  8/1994  Kajino et al. ......................... 236/91 C
5,832,990  11/1998  Eisenhour ............................. 165/43 X

FOREIGN PATENT DOCUMENTS

A-59-137208  8/1984  Japan .

Primary Examiner—William Wayner
Attorney, Agent, or Firm—Harness, Dickey & Pierce, PLC

[57] ABSTRACT

An air conditioning system for a cabin of a vehicle having a rear hatch. The air conditioning system has a sun radiation sensor for detecting a sun radiation amount into a rear part of the cabin and an air conditioning means for providing air conditioning at a rear seat section of the cabin in accordance with the sun radiation amount detected by the sun radiation amount sensor. The sun radiation amount sensor is mounted on the rear hatch in such a manner that the sun radiation sensor moves together with the movement of the rear hatch. A sensor for detecting if the rear hatch is open or closed is provided. A sun radiation amount detected by the sun radiation sensor during a closed condition of the rear hatch is memorized. When it is detected that the rear hatch is opened, the air conditioning, by the air conditioning means of the rear seat section, is done based on the memorized value of the sun radiation amount just before the rear hatch was opened.

6 Claims, 6 Drawing Sheets

FRONT DIRECTION OF CABIN

AIR CONDITIONING SYSTEM FOR VEHICLE

BACKGROUND OF THE INVENTION

1. Field of the Invention

The present invention relates to an air conditioning system for a vehicle and, in particular, to a correction of a sun radiation sensor used in such an air conditioning system.

2. Description of Related Art

An independently controlled type of air conditioning system for a vehicle has been recently proposed, wherein different air conditioning zones in a cabin, such as a driver's zone and a passenger's zone, are subjected to independent control of an air conditioning requirement such as a discharged air temperature. Such an independent control of different zones in a vehicle is also required in the case of a so-called panel van type car. Namely, such a type of car has an increased cabin volume, so that independent air conditioning is frequently required in a front and rear zones of the cabin.

In such a independently controlled air condition system, in order to obtain precise air conditioning control in accordance with a air conditioning condition at a rear part of the cabin, the inventors of the present patent application have tested a sun radiation sensor which is arranged at the rear portion of the cabin for detecting a sun radiation amount introduced into the rear portion of the cabin. Furthermore, as a location for the sun radiation amount sensor suitable for the detection of the sun radiation onto a rear seat in the cabin, an inner wall of a rear hatch at an rear end of the cabin has been selected and a test has been done. According to the test, the inventors have found that the following problems occur. Namely, in the arrangement of the sun radiation sensor for detecting a sun radiation amount onto the rear seat of the cabin, a movement of the rear hatch, to open the latter, causes the rear seat sun radiation sensor to be moved together with the movement of the hatch. As a result, a difference is generated in a value of the incident angle of the sun radiation between the closed condition of the rear hatch and the opened condition of the rear hatch irrespective of a fact that the sun radiation amount is unchanged. Thus, a desirable detection of the sun radiation amount by the sun radiation sensor on the inner surface of the rear hatch is only possible at the closed condition of the rear hatch. When the rear hatch is moved to the open position, the detected value of the sun radiation amount by the sensor on the rear hatch is largely deviated from the sun radiation amount actually introduced onto the rear seat in the cabin. As a result, in a condition that the temperature of the cabin is controlled to a predetermined value with a small difference between the temperature inside the cabin and an outside air temperature, an opening of the rear hatch causes the sun radiation amount detected by the sun radiation sensor to be largely deviated from the actual value of the sun radiation amount, which prevents the air conditioning from being desirably controlled at the rear seat zone in the cabin.

SUMMARY OF THE INVENTION

An object of the present invention is to provide an air conditioning system for a vehicle capable of overcoming the above mentioned difficulty in the prior art.

Another object of the present invention is to provide an air conditioning system for a vehicle capable of providing a precise air conditioning at a rear seat zone in a cabin irrespective of an opening or closing of the rear hatch.

According to the present invention, an air conditioning system is provided for a vehicle having a cabin provided with a rear hatch at a rear end of the vehicle, said system comprising:

sun radiation detecting means for detecting a sun radiation amount into the cabin;

air conditioning means, responsive to the detected sun radiation amount, for obtaining an air condition of the cabin;

said sun radiation detecting means being mounted to said rear hatch in such a manner that the sun radiation detecting means is moved in accordance with the movement of the rear hatch for its opening/closing;

opening/closing detecting means for detecting the opening/closing conditions of the rear hatch, and;

storing means, during the opened condition of the rear hatch, for storing the sun radiation amount detected by the sun radiation detecting means during the closed condition of the rear hatch just before the opening of the rear hatch;

the air conditioning by said air conditioning means during the opened condition of the rear hatch being done based on the stored sun radiation amount.

A movement of the rear hatch from a closed condition to an opened condition is done when the vehicle is stopped. Thus, a sun radiation amount detected by the sun radiation sensor just before the rear hatch is opened corresponds to a sun radiation amount introduced into the rear seat zone. As a result, precise air conditioning control of the rear seat zone when the rear hatch is opened can be precisely done based on the sun radiation amount actually introduced into the rear seat zone.

There is a case that, during a control cycle of the air conditioning means, a plurality of samplings of detected values by the sun radiation are done and an average value of the these sampled values is calculated. The average value is used for controlling the air conditioning means. Thus, in the present invention, the sun radiation amount detected by the sun radiation sensor just before the opening of the rear hatch can be such an average value of the sampled values.

DETAILED EXPLANATION OF PREFERRED EMBODIMENTS

Now, embodiments of the present invention will be explained, as applied to an air conditioning system for a one box type car having a large volume cabin.

Figure 1:
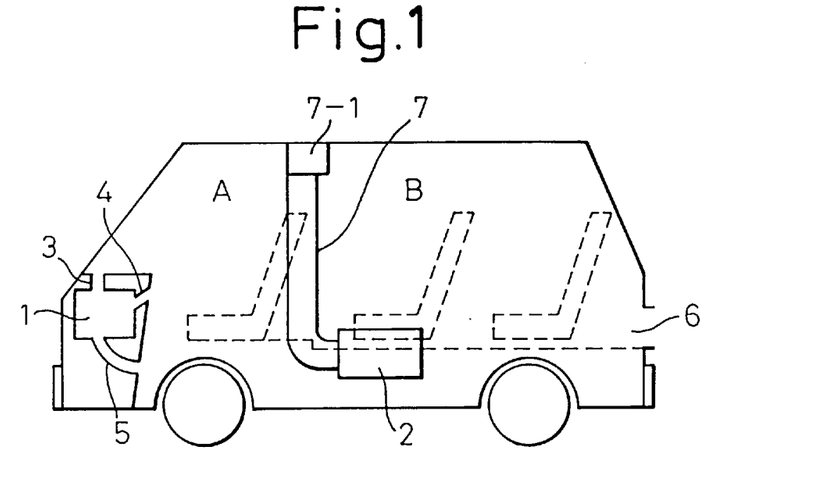
FIG. 1 is a schematic view of an air conditioning system for a vehicle provided with a front and rear air conditioning units according to an embodiment of the present invention.

In a first embodiment, as shown in FIG. 1, an air conditioning system for a vehicle is constructed by a first air conditioning unit 1 directed to air conditioning a front zone A of a cabin, including the front seats and a second air conditioning unit 2 directed to an air conditioning a rear zone B, including the rear seats. The front seat air conditioning unit 1 is arranged at a location below an instrument panel in front of the front seats. In a well known manner, the air conditioning unit 1 is formed with a defroster duct 3 for discharging an air flow directed to an inner surface of a wind shield at a bottom portion, a front upper level duct 4 for discharging an air flow directed towards an upper part of a passenger and a front lower level duct 5 for discharging an air flow directed towards a lower part of a passenger. Furthermore, also in a well known manner, in the unit 1, mode selection is possible between an outside air introduction mode where outside air is introduced for generating an air flow into the cabin and a recirculating mode where recirculation of the air inside the cabin is done.

The rear seat air conditioning unit 2 is arranged in a rear part of the cabin at a location between a bottom wall of the cabin and an outer frame of the vehicle. The unit 2 is provided with a duct 7 directed to a duct 7-1 in the ceiling of the cabin, which generates an air flow directed to an upper part of the passengers in the rear seat and with a lower duct 25 which generates an air flow which is usually hot and is directed to a lower part of passengers in the rear seat. The rear seat air conditioning unit 2 is a recirculation type, where only the inside air is recirculated for the air conditioning.

Figure 2:
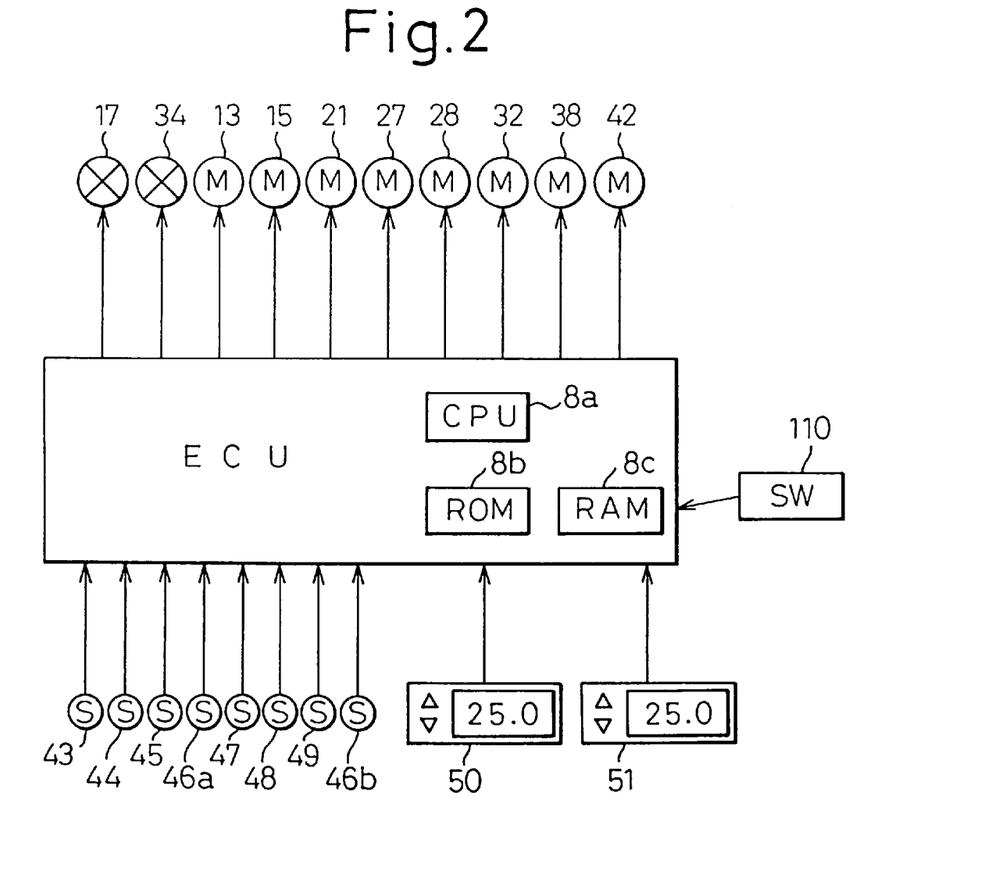
FIG. 2 is a diagrammatic view of an electric control apparatus in the system in FIG. 1.

In a well known manner, an electronic control unit (ECU) 8, as shown in FIG. 2 is provided for obtaining an independent air conditioning operation of the first and second air conditioning units 1 and 2.

Figure 3:
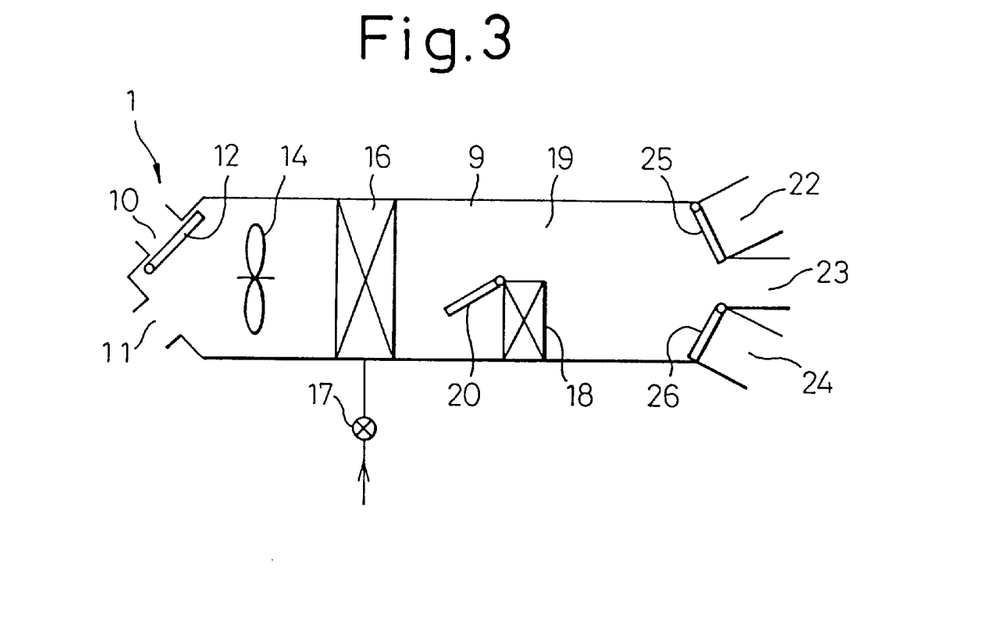
FIG. 3 is a schematic view of a front seat air conditioning unit in FIG. 1.

Now, details of the construction of the front seat air conditioning unit 1 will be explained. As shown in FIG. 3, the unit 1 is provided with a casing 9, which forms, at its upstream end, an inner air inlet 10 for air from the cabin and an outside air inlet 11 for outside air, and a switching door 12 which is moved between a first position where the inner air inlet 10 is opened and a second position where the outside air inlet 11 is opened. The switching door 12 can take an intermediate position between the first and second positions, so that the ratio between the inside air and the outside air is desirably controlled. In order to obtain a desired position of the switching door 12, the latter is connected to a servo-motor 13 (FIG. 2) as a driving means.

In FIG. 3, a fan 14 as a blower means is arranged in the casing 9 at a location downstream from the switching door 12. The fan 14 is connected with a blower motor 15 (FIG. 2) as a drive means. The rotating speed of the fan 14, i.e., the amount of air discharged into the cabin is controlled in accordance with an electric voltage applied to the blower motor 15. Such a control of the electric voltage is executed by the ECU 8 in FIG. 2.

A front seat evaporator 16 is arranged in the casing 9 at a location downstream from the fan 14. In a well known manner, the evaporator 16 is connected with a compressor (not shown) driven by an engine of the vehicle, a condenser (not shown) and a pressure reducer (not shown) via a refrigerant conduit, so that a refrigerating system is constructed. In the refrigerant conduit at a location upstream from the front seat evaporator 16 an electromagnetic valve 17 is arranged for controlling a flow of the refrigerant to the evaporator 16.

A front seat heater 18 is arranged in the casing 9 at a location downstream from the evaporator 16, so that the air cooled at the evaporator 16 is heated. The heater 18 is formed therein with a passageway for engine cooling water from a water cooling system for the internal combustion engine. Heating of the air is done by heat generated by the engine cooling water. A by-pass passageway 19 is formed so that the air flow from the evaporator 16 can by-pass the heater 18.

An air mix door 20 is arranged so that it is moved between a first position where the heater 18 is closed and a second position where the by-pass passageway 19 is closed. The air mix door 20 can take a desired position intermediate between the first and second positions. As a result, the air mix door 20 can function as a means for controlling the ratio of the total amount of the cold air passed through the evaporator 18 to the amount of the cold air passed through the by-pass passageway 19. The air mix door 20 is connected to a servo-motor 21 (FIG. 2) as a drive means.

As shown in FIG. 3, the air conditioner casing 9 is, at its rear end, formed with an opening 22 connected to the defroster duct 3 in FIG. 1, an opening 23 connected to the upper level outlet duct 4 in FIG. 1 and an opening 24 connected to the lower level outlet duct 5 in FIG. 1. Inside the casing 9, a defroster door 25 and an upper/lower level switching door 26 are arranged. The defroster door 25 is moved between a position where the defroster opening 22 is opened and a position where the defroster opening 22 is closed. The upper/lower level switching door 26 is moved between a position where the upper level opening 23 is opened while the lower level opening 24 is closed and a position where the lower level opening 24 is opened while the upper level opening 23 is closed. These doors 25 and 26 are connected to servo-motors 27 and 28 (FIG. 2) as driving means, respectively.

Figure 4:
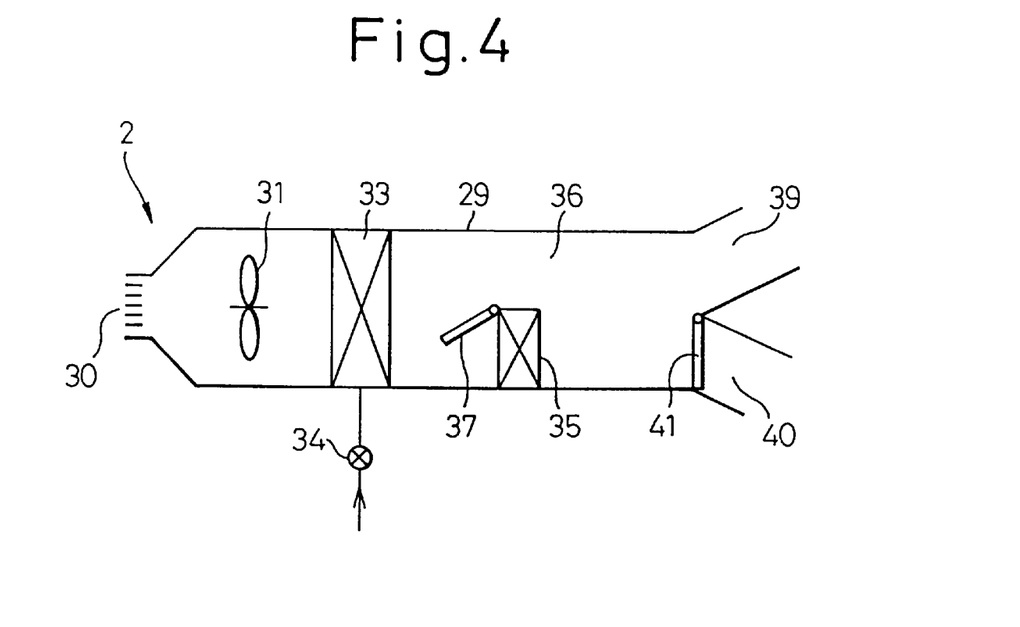
FIG. 4 is a schematic view of a rear seat air conditioning unit in FIG. 1.

Now, details of the construction of the rear seat air conditioning unit 1 will be explained. As shown in FIG. 4, the unit 1 is provided with a casing 29 which forms, at its upstream end, an inner air inlet 30 opened to the cabin at a location adjacent a lower part of the rear passenger's seats.

In FIG. 4, a fan 31 as a blower means is arranged in the casing 29 so that the fan 31 faces with the air inlet 30. The fan 30 is connected with a blower motor 32 (FIG. 2) as a drive means. The rotating speed of the fan 30 is controlled in accordance with an electric voltage applied to the blower motor 32. Such a control of the electric voltage is executed by the ECU 8 in FIG. 2.

A rear seat evaporator 33 as a heat exchanger for cooling air is arranged in the casing 29 at a location downstream from the fan 31. In a well known manner, the evaporator 33 is arranged in the refrigerating system including the front seat evaporator 16 as explained above. In the refrigerant conduit upstream from the evaporator 33, an electromagnetic valve 34 is arranged for controlling a flow of the refrigerant to the evaporator 33.

A rear seat heater 18 is arranged in the casing 29 at a location downstream from the evaporator 35, so that the air cooled at the evaporator 33 is heated. Similar to the heater 18 in the front seat air conditioning unit 1, the heater 35 is formed therein with a passageway for engine cooling water from a water cooling system for the internal combustion engine, so that a heating of the air is done by heat from the engine cooling water. A by-pass passageway 36 is formed so that the air flow from the evaporator 33 can by-pass the heater 35.

Similar to the front seat air conditioning unit 1, an air mix door 37 is arranged so that a ratio between the total amount of the cold air passed through the evaporator 33 and an amount of the cold air passed through the by-pass passageway 36 is desirably controlled. The air mix door 37 is connected to a servo-motor 38 (FIG. 2) as a drive means.

As shown in FIG. 4, the air conditioner casing 29 is, at its downstream end, formed with an upper level outlet opening 34 connected to the ceiling duct 7 (FIG. 1) and a rear lower level outlet opening 40 connected to a rear seat lower level outlet duct (not shown). In the casing 29, a upper/lower level switching door 41 is provided. The upper/lower level switching door 41 is moved between a position where the rear upper level opening 39 is opened while the rear lower level opening 40 is closed and a position where the rear upper level opening 39 is closed while the rear lower level opening 40 is opened. The door 41 is connected to a servo-motor 42 (FIG. 2) as a driving means.

In FIG. 2, the electronic control unit (ECU) 8a is provided with various elements such as a microcomputer including a central processing unit (CPU) 8a, a read only memory (ROM) 8b, and a random access memory (RAM) 8c, drive circuits for generating driving signals to the various electric motors 13 to 42, and an analogue to digital converter. Furthermore, the power to the ECU 8a is supplied by a battery of the vehicle (not shown).

The ECU 8 has inlet ports connected to various sensors, such as a front seat inner temperature sensor 43 for detecting a temperature Tr(Fr) at a front seat in the front seat zone A, a rear seat inner temperature sensor 44 for detecting a temperature Tr(Rr) at a front seat in the rear seat zone B, an outside temperature sensor 45 for detecting a temperature Tam of the outside air, a front seat sun radiation amount sensor 46a for detecting a sun radiation amount Ts(Fr) into the front seat zone A, a rear seat sun radiation amount sensor 46b for detecting a sun radiation amount Ts(Rr) into the rear seat zone B, a temperature sensor 47 for detecting a temperature Te(Fr) of the air which has passed through the front seat evaporator 16, a temperature sensor 48 for detecting a temperature Te(Fr) of the air which has passed through the rear seat evaporator 33 and a temperature sensor 49 for detecting a temperature TW of the engine cooling water. The input ports of the ECU 8 are also connected to various setters, such as a setter 50 for setting a temperature Tset(Fr) at the front seat and a setter 51 for setting a temperature Tset(Rr) at the rear seat.

In a well known manner, analogue signals from the sensors 43 to 49 are fed to the A-D converter in the ECU and are subjected to an analogue to digital conversion prior to an introduction into the microcomputer. The ECU 8 is provided with outlet ports, which are electrically connected to the electromagnetic valves 17 and 34, the servo-motors 13, 21, 27, 28, 38 and 43 and the blower motors 15 and 32.

The front seat temperature setter 50 is located on a front seat air conditioning panel arranged in an instrumental panel (not shown) in front of the front seats of the vehicle. In a well known manner, the front seat air conditioning panel is further provided with a switch for making a selection between various air outlet modes, a switch for making a selection between an inside air recirculation mode and an outside air intake mode, a switch for making an adjustment of a discharged air amount and a switch for making a selection of a mode for allowing an automatic control of various air conditioning means in the front seat air conditioning unit 1.

The rear seat temperature setter 51 is arranged on a rear seat air conditioning panel (not shown) in the ceiling of the cabin in the rear seat zone. The rear seat air conditioning panel is further provided with a switch for allowing the discharged air flow amount to be adjusted and a switch for making a selection of a mode for allowing an automatic control of various air conditioning means in the rear seat air conditioning unit 2.

Figure 5:
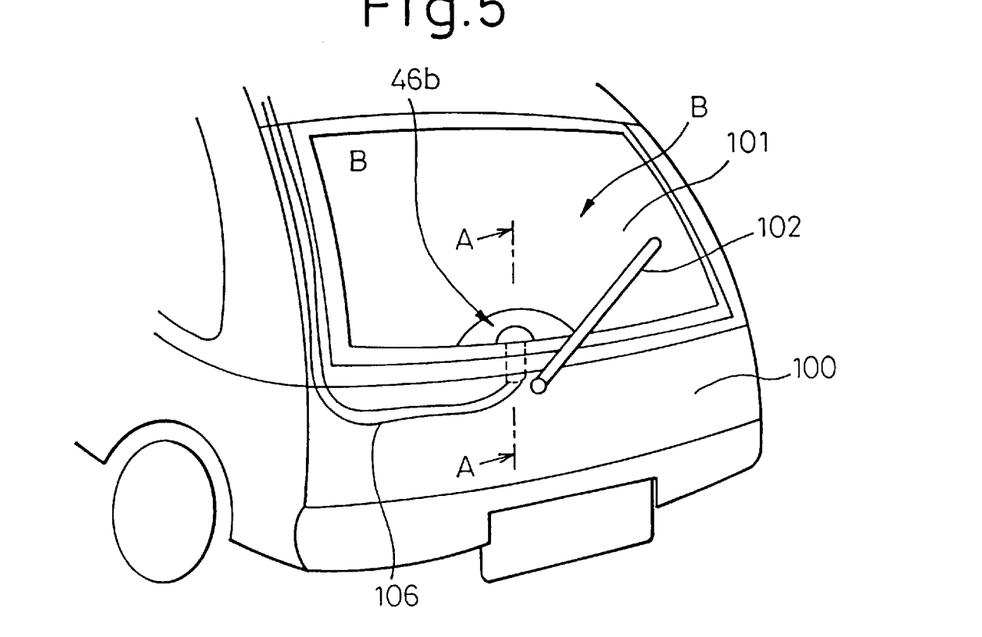
FIG. 5 is a schematic perspective view of a rear hatch on which a sun radiation sensor is mounted.

Now, the location of the rear sun radiation amount sensor 46b will be explained. In FIG. 5. the rear sun radiation amount sensor 46b is mounted on the rear hatch 100 of the vehicle, which is rotatable about an axis between a closed position, shown in FIG. 5 and an opened position, shown in FIG. 8. The rear hatch 100 includes a frame member 105 (FIG. 6) made of a metal material such as a steel and a rear glass plate 101, for allowing a driver to see the rear, which is fixedly connected to the frame member 105 in a well known manner. A rear wiper 102 is arranged on an outer surface of the rear glass plate 101 for executing a cleaning operation of the plate 101. A wiper motor has a drive member 103, which is connected to a bottom end of the rear wiper 102 and which is passed through the plate 101 as shown in FIG. 6.

The rear sun radiation amount sensor 46b is constructed by a photo diode as a light receiving element for generating an electric current, the value of which varies in accordance with the introduced sun radiation amount. Furthermore, as will be seen from FIGS. 5 and 8, the rear seat radiation amount sensor 46b is located at a rear end of the rear seat zone B of the casing and at a middle position along a width of the cabin. In more detail, as shown in FIG. 6, a mounting plate 104 is fixedly located on the inner side of the rear glass plate 101 opposite the wiper 102, while the rear seat sun radiation sensor 46b is fixedly connected to the mounting plate 104 by a any suitable means.

Figure 6:
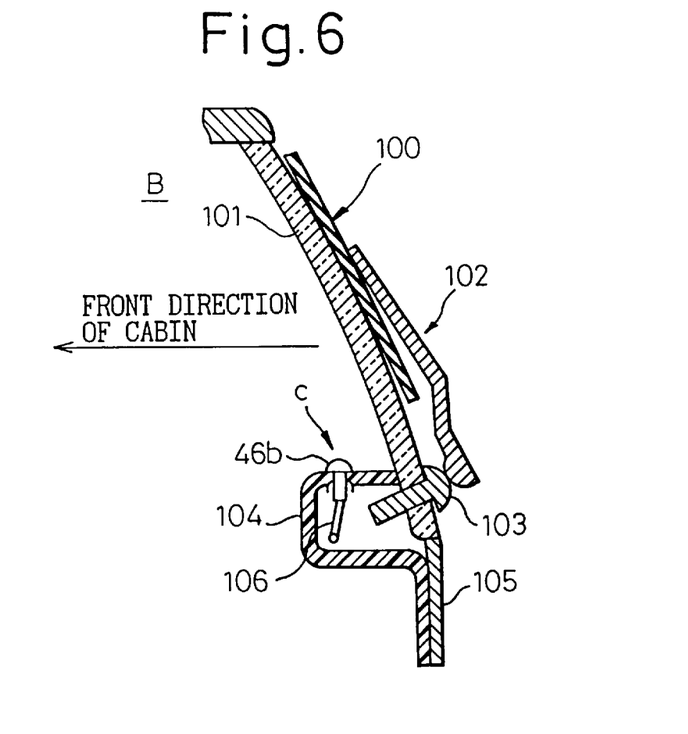
FIG. 6 is a cross sectional view of the rear hatch in FIG. 5 which illustrates a mounting of the sun radiation sensor to the rear hatch.

As shown in FIG. 6, a lead wire 106 is, at its one end, electrically connected to the rear seat sun radiation sensor 46b. The lead wire 106 is, at the other end, first, passed through a space between an inner and outer walls of the rear hatch 100 and, then, passed through a space between an inner and outer wall of a vehicle body (not shown). The other end of the lead wire 107 is, finally, connected to the ECU 8.

According to the embodiment, the mounting plate 104 is formed of a resin material such as a foamed polyurethane or polypropylene, while the outer surface of the mounting plate 104 is a decorated surface in the cabin. Finally, as shown in FIG. 6, the mounting plate 104 is fixedly connected to the outer frame member 105 of the rear hatch 100 by any suitable means such as bolts.

Figure 7:
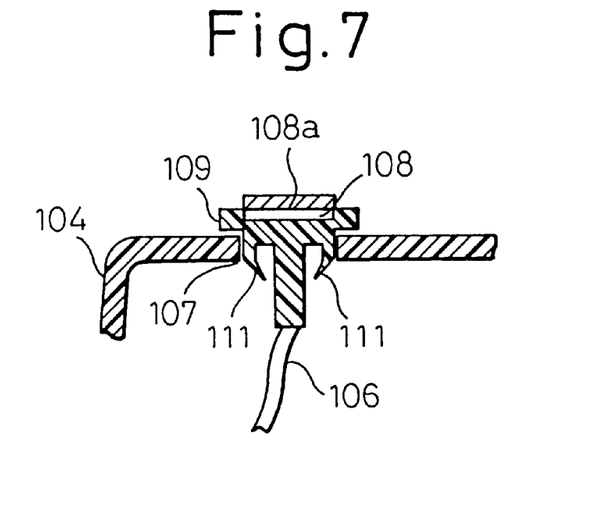
FIG. 7 is a partial enlarged view of FIG. 6 at a location where the sun radiation sensor is mounted to the rear hatch.

FIG. 7, which is an enlarged view of a portion of FIG. 6 designated by C, illustrates how a connection of the rear seat sun radiation sensor 46b to the support plate 104 is done. Namely, the mounting plate 104 is formed with a mounting hole 107, to which the rear seat sun radiation sensor is fitted. The sensor 46b is made of a resilient resin material and is formed as a cup having a pair of grippers 111. The fitting of the sensor 46b to the mounting plate 104 is done by pressing the sensor 46b to the mounting hole 107 from the above, which causes the grippers 111 to be resiliently deformed radially inwardly, resulting in that grippers 11 being firmly fitted to the opening 107.

In the condition that the rear seat sun radiation sensor 46b is mounted to the mounting plate 104, the photo diode 108 is arranged in such a manner that its light receiving surface 108a is faced upwardly. Furthermore, the arrangement of the rear seat sun radiation sensor 46b is such that, in the closed condition of the rear hatch 100, a precise detection of the sun radiation to the rear seat zone B is done.

Figure 8:
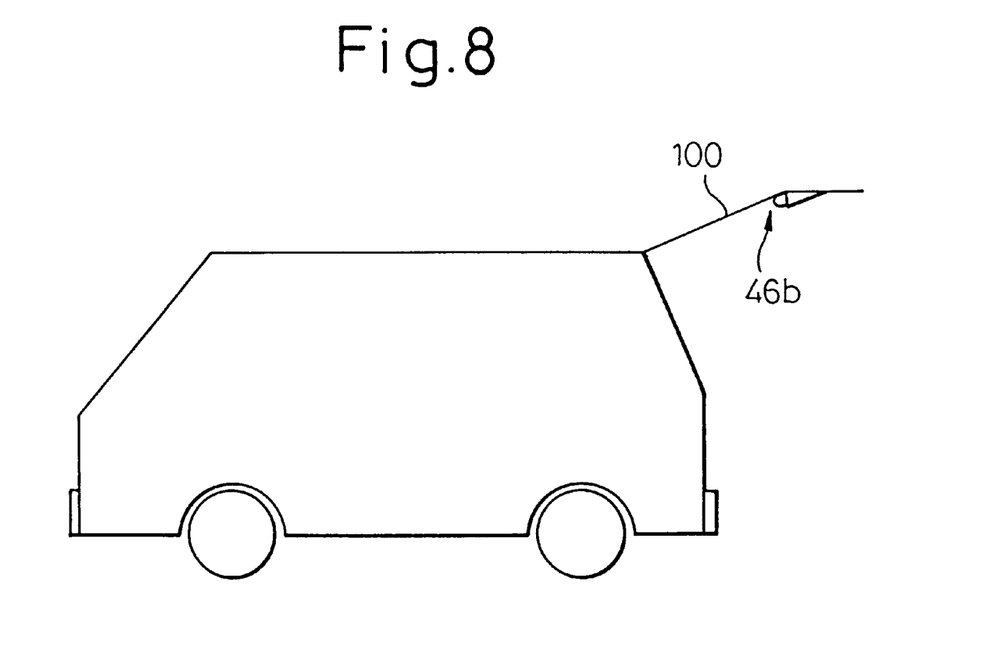
FIG. 8 is a schematic side view of the vehicle where the rear hatch with the sun radiation sensor is opened.

In the above arrangement of the rear seat sun radiation sensor 46b which is mounted to the mounting plate 104 which is, in turn, mounted to the rear hatch 100, the opening of the latter causes the sensor 46b to be moved together with the rotating movement of the rear hatch 100 as shown in FIG. 8. Thus, the value of the incident angle to the sun radiation sensor in the closed condition of the rear hatch 100 as shown in FIG. 5 is different from that in the opened condition of the rear hatch 100 as shown in FIG. 8. As a result, precise detection of the sun radiation amount to the rear seat zone B by the rear seat sun radiation sensor 46b is only possible under the closed condition of the rear hatch 100. Under the opened condition of the rear hatch 100, the value of the sun radiation amount detected by the sensor 46b is largely different from the actual sun radiation amount onto the rear seat zone.

In order to combat the above mentioned problem, as shown in FIG. 2, a switch 110 for detecting an open or closed position of the rear hatch 100 is provided and is connected to an inlet port of the ECU 8. The electric signal, indicating whether or not the rear hatch is opened, is used for correcting the detected value of the sun radiation amount Ts(Rr) by the sun radiation sensor 46b. Any suitable construction is employed for the sun radiation sensor 46b. The sun radiation sensor is, for example, constructed by the one having a pair of contacts, which are under a contacted condition when the rear hatch 100 is closed, so that an electric signal indicating the closed of the rear hatch 100 is issued to the ECU 8 and under a detached condition when the rear hatch 100 is opened, so that an electric signal indicating the opened condition of the rear hatch 100 is issued to the ECU 8.

Now, an operation of the ECU 8 will be explained with reference to a flowchart in FIG. 9. When the ignition switch is made ON, the ECU 8 is fed with an electric supply, which causes the routine in FIG. 9 to execute. First, at step S10, an initialization is executed, of the RAM, various ports as well as counters, and includes a process to clear the flag F. At the following step S20, the values Tset(Fr) and Tset(Rr) set by the respective temperature setters 50 and 51 are read out.

At the following step S30, the signals from the sensors 43 to 49, after the execution of the analogue to digital transformation, Tr(Fr), Tr(Rr), Tam, Ts(Fr), Ts(Rr), Te(Fr), Te(Rr) and Tw, are read out. Furthermore, the condition of the rear hatch 100 detected by the rear hatch switch 110 is also read out.

At step S40, a correction of the detected sun radiation amount Ts(Rr) by the rear seat sun radiation sensor 46b read out at the step S30 to the actual sun radiation amount into the rear seat zone B is done in accordance with the ON/OFF condition of the door switch 110. A detail of this step S40 will be explained later.

Next, at step S50, a calculation of the target value of the front seat discharged air temperature TAO(Fr) in °C. is calculated by the following equation.

$$TAO(Fr) = Kset(Fr) \times Tset(Fr) - Kr(Fr) \times Tr(Fr) - Kam(Fr) \times Tam - Ks(Fr) \times Ts(Fr) + C(Fr) \quad (1),$$

where Kset(Fr), Kr(Fr) and Kam(Fr) are correction gains for the front seat zone set temperature Tset(Fr), the front seat actual temperature Tr(Fr) and the front seat sun radiation amount Ts(Fr), respectively and C(Fr) is a front seat correction constant.

Then, at step S60, an inlet mode selection between the inside air mode and the outside air mode is done based on the target discharged air temperature TAO(Fr) and a map stored in the ROM. Namely, the map is constructed by values of the degree of the target opening of the inside air/outside air switching door 12. A map interpolation calculation of the target opening SWI of the inside air/outside air switching door 12 is done. In the full inside air mode, the value of the SWI is 100 (%). Contrary to this, in the full outside air mode, the value of the SWI is 0 (%)

At the following step S70, an outlet mode selection between the upper level mode, the bi-level mode and the lower level outlet mode is done based on the target discharged air temperature TAO(Fr) and a map stored in the ROM. In this case, at the upper level mode ("face" mode), the air is, via the front seat upper level duct 4, directed to an upper part of a passenger in the front seat. At the bi-level mode (B/L mode), the air is, via both of the front seat upper level duct 4 and the front seat lower level duct 5, directed to both of the upper and lower parts of the passenger in the front seat. Furthermore, at the lower level mode ("foot" mode), the air is, via the front seat lower level duct 5, directed to the lower part of the passenger in the front seat.

At the following step S80, a determination of the voltage to be applied to the blower motor 15 at the front seat air conditioning unit 1 is done based on the front seat target air temperature TAO(Fr) and a map stored in the ROM. Namely, the map is constructed of values of the voltage to be applied to the blower motor 15 in accordance with the values of the TAO(Fr). A map interpolation calculation is done to calculate a value of the voltage corresponding to the calculated value of the TAO(Fr).

At the following step S90, a calculation of the target value of rear seat discharged air temperature TAO(Rr) in °C. is calculated by the following equation.

$$TAO(Rr) = Kset(Rr) \times Tset(Rr) - Kr(Rr) \times Tr(Rr) - Kam(Rr) \times Tam - Ks(Rr) \times Ts(Rr) + C(Rr) \quad (2),$$

where Kset(Rr), Kr(Rr) and Kam(Rr) are correction gains for the rear seat zone set temperature Tset(Rr), the rear seat actual temperature Tr(Rr) and the rear seat sun radiation amount Ts(Rr), respectively and C(Rr) is a rear seat correction constant.

Then, at step S100, a determination of the voltage to be applied to the blower motor 32 at the rear seat air conditioning unit 2 is done based on the rear seat target discharged air temperature TAO(Rr) and a map stored in the ROM. Namely, the map is constructed of values of the voltage to be applied to the blower motor 32 with respect to values of the TAO(Rr). A well known map interpolation calculation is done to calculate a value of the voltage corresponding to the calculated value of the TAO(Rr).

At the following step S120, the degrees of the opening θ(Fr) and θ(Rr) of the air mix doors 20 and 37 in % are determined based on the following equations, which are stored in the ROM.

$$\theta(Fr) = 100 \times ((TAO(Fr) - Te(Fr))/(Tw - Te(Fr))) \quad (3)$$

$$\theta(Rr) = 100 \times ((TAO(Rr) - Te(Rr))/(Tw - Te(Rr))) \quad (4)$$

At the following step S130, signals are issued to the respective actuators so that the calculated modes at the steps S50 to S70 and steps S90 to S110 are obtained.

At the following step S140, it is determined if a predetermined cycle time τ, of for example, 4 seconds has elapsed. If it is determined that the predetermined cycle time τ has not elapsed, the waiting routine is executed. At the following step S140, it is determined if a predetermined cycle time τ, of for example, 4 seconds has elapsed. When a determination is obtained that the predetermined cycle time τ has not elapsed, i.e., no result at step S140, the waiting routine is executed. When a determination is obtained that the predetermined cycle time τ has elapsed, i.e., yes result at step S140, the routine goes back to the step S50.

Figure 9:
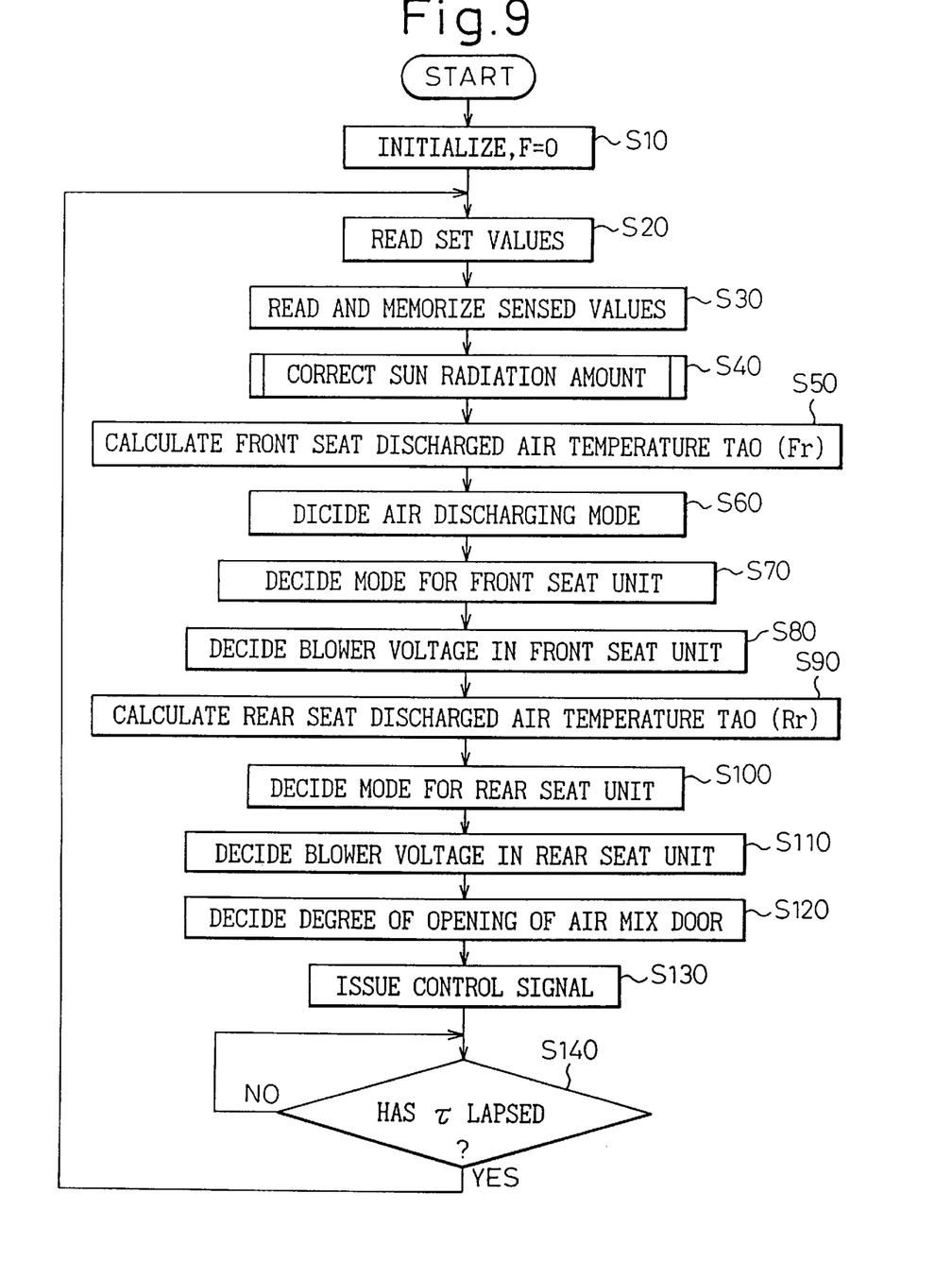
FIGS. 9 and 10 are flow charts illustrating the operation of the electric control unit in FIG. 1.
Figure 10:
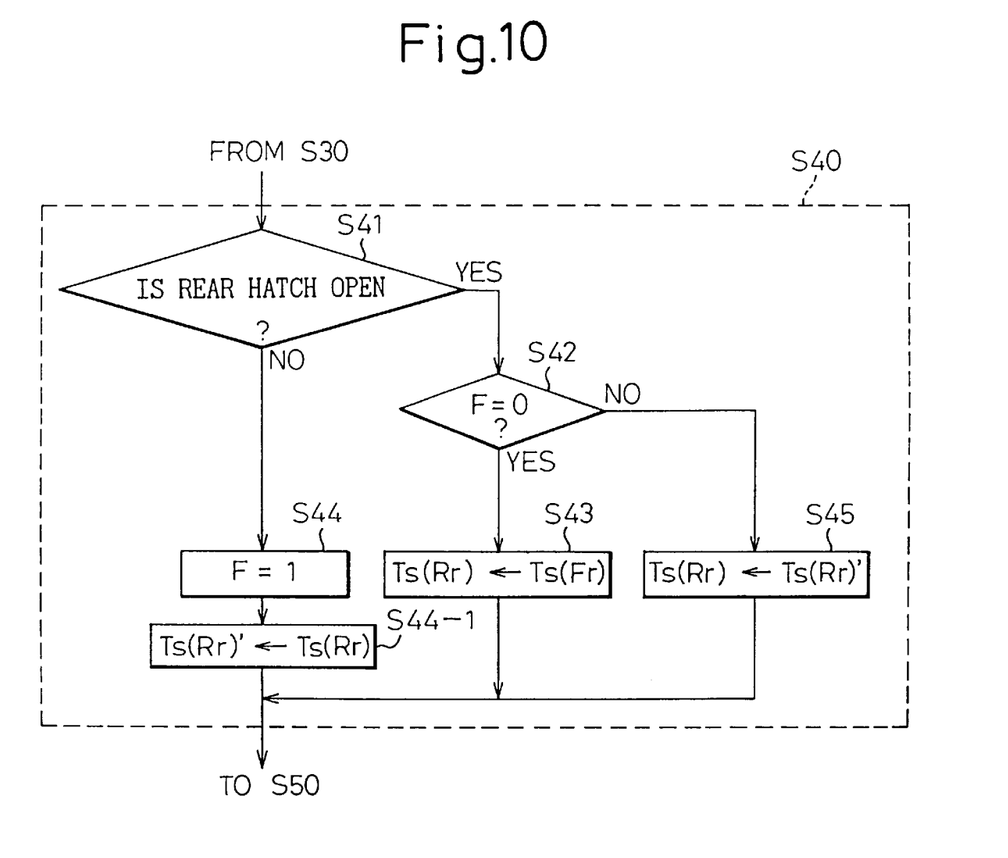

FIG. 10 is a flowchart illustrating a detail of the sun radiation amount correcting step S40 in FIG. 9. At step S41, it is determined if the rear hatch switch 110 is in the ON condition, i.e., if the rear hatch 100 is opened. When a determination is obtained that the rear hatch is under a closed condition, the routine goes to a step S44. At the step S44, a flag F is set (1), which indicates that the rear hatch 100 is closed. At step S44-1, a value of Ts(Rr) is moved to Ts(Rr)'. Then, the routine goes to steps below S50 in FIG. 9. Namely, in order to calculate the target temperatures TAO (Fr) and TAO(Rr) by the equations (1) and (2), respectively, the run radiation amounts Ts(Fr) and Ts(Rr) detected by the front seat and rear seat sun radiation sensors 46a and 46b, respectively are used. In other words, a correction of the detected value by the rear seat sun radiation amount sensor 46b is not done.

Contrary to this, when a determination is obtained that the rear hatch 100 is opened, the routine goes to step S42, where it is determined if the flag F is cleared (0). The flag F is cleared at an initializing process (step S10 in FIG. 8) which is executed only once when an ignition key switch is made on for causing the engine to be started. Thus, a result of the determination that the flag F=0 at the step S42 indicates that the rear hatch 100 opened prior to the switching on of the ignition key switch is still opened. In this case, the rear seat sun radiation sensor 46b detects the sun radiation amount which is different from that actually introduced into the rear seat zone B in the cabin. Thus, the routine goes to a step S43, where the sun radiation amount Ts(Fr) detected by the front seat sun radiation sensor 46a is moved to an area TS(Rr) of the RAM 8c for storing the data of the sun radiation amount for the rear seat zone B.

In short, when the engine is started, while keeping the rear hatch opened, the value detected by the rear seat sun radiation sensor 46b is not used and the value detected by the front seat sun radiation sensor 46a is used as the sun radiation amount at the rear seat zone B.

The determination no at step S42 means that the rear hatch 100 was once closed (F=1) after the engine is started and that the rear hatch 100 has since been opened. In this case, the value Ts(Rr) detected by the rear seat sun radiation amount sensor 46b is largely deviated from the amount actually introduced into the rear seat zone B of the cabin. Thus, the routine goes into step S45, where the data, in an area Ts(Rr)' of the RAM 8c for storing the sun radiation amount detected by the rear seat sun radiation amount sensor 46b when the rear hatch 100 is under the closed condition and just before the switching of the rear hatch 100 to the opened condition occurs is moved to Ts(Rr).

Such an opening of the rear hatch from the closed state to the opened state, usually occurs when the vehicle is stopped. Thus, the sun radiation amount on the rear seat zone B is maintained substantially unchanged. Thus, the value Ts(Rr)' detected by the rear seat radiation sensor 46b during the closed state of the rear hatch 100 just before switching to the opened state of the rear hatch, may be a correct measure of the sun radiation amount onto the rear seat zone B.

As a result, when the cabin is in a desirable air conditioned state and when a difference between the temperature at the rear seat zone and the temperature outside the cabin is small so that an opening of the rear hatch for an introduction of the outside air is less likely to make a passenger to be uncomfortable, a precise air conditioning control of the rear seat zone B in accordance with the sun radiation amount into the zone is realized.

In the above embodiment, the rear hatch 100 is of a type that is rotatable in vertical (upward/downward) directions about a horizontal axis at the upper part of the vehicle. However, the present invention can be applicable to a vehicle, where a rear hatch is rotated in horizontal directions about a vertical axis.

Furthermore, in the present invention, the opened or closed condition of the rear hatch 100 may be detected by the detected values of the front seat sun radiation sensor 46a and the rear seat sun radiation sensor 46b. Namely, during stoppage of the vehicle with the rear hatch 100 closed, the detected values are unchanged between the front and rear seat sun radiation sensors 46a and 46b. However, if the rear hatch 100 is opened during the stoppage of the vehicle, the detected value of the front seat sun radiation sensor 46a is unchanged, while the detected value of the rear seat sun radiation sensor 46a is changed. Thus, an opening of the rear hatch is opened from the closed condition may be detected by detecting that the detected value of the front seat sun radiation sensor 46a is maintained constant, while the detected value of the rear seat sun radiation sensor 46b is largely changed.

As a further modification, in order to execute air conditioning in the front seat zone A of the cabin, it may be possible that the front seat unit 1 is controlled in accordance with the value detected by the rear seat sun radiation amount sensor 46b.

We claim:

1. An air conditioning system for a vehicle having a cabin provided with a rear hatch at a rear end of the vehicle, said system comprising:

sun radiation detecting means for detecting a sun radiation amount into the cabin;

air conditioning means, responsive to the detected sun radiation amount, for obtaining an air condition of the cabin;

said sun radiation detecting means being mounted to said rear hatch in such a manner that the sun radiation detecting means is moved in accordance with the movement of the rear hatch for opening or closing;

open or closed detecting means for detecting the open or closed condition of the rear hatch, and;

storing means which, during the opened condition of the rear hatch, stores the sun radiation amount detected by the sun radiation detecting means during the closed condition of the rear hatch just before the opening of the rear hatch;

the air conditioning by said air conditioning means during the opened condition of the rear hatch being done based on the stored sun radiation amount.

2. An air conditioning system according to claim 1, wherein said cabin is divided into a front seat zone and a rear seat zone and said air conditioning means is for air conditioning said rear seat zone.

3. An air conditioning system according to claim 2, wherein said system further comprises: temperature sensing means for sensing the temperature at the rear seat zone and temperature setting means for setting a temperature at the rear seat section of the cabin, and wherein;

said air conditioning means comprise calculating means for calculating a target temperature of the air discharged to the rear seat section of the cabin based on the temperature at the rear seat zone detected by the temperature sensing means, the set temperature set by the temperature setting means and the sun radiation amount detected by the sun radiation sensor and means for obtaining the calculated target air temperature at the rear seat zone in the cabin.

4. An air conditioning system according to claim 1, wherein said rear hatch is constructed such that the opened state is obtained by rotating the rear hatch upwardly from the closed state of the rear hatch.

5. An air conditioning system, according to claim 1, wherein said sun radiation sensor comprise a sensing element for detection of a sun radiation amount and a supporting member for supporting the sensing element, said supporting member being located on a portion of the rear hatch constructing an inner wall of the rear hatch at a location adjacent a rear glass in the rear hatch.

6. An air conditioning system for a vehicle having a cabin provided with a rear hatch at a rear end of the vehicle, said system comprising:

sun radiation detecting means for detecting a sun radiation amount into the cabin;

air conditioning means, responsive to the detected sun radiation amount, for providing air condition of the cabin;

said sun radiation detecting means being mounted to said rear hatch in such a manner that the sun radiation detecting means is moved in accordance with the movement of the rear hatch for opening or closing;

open or closed detecting means for detecting the open or closed condition of the rear hatch, and;

correction means for correcting the sun radiation amount detected by the sun radiation detecting means when the opened condition of the rear hatch from the closed condition is detected;

the air conditioning by said air conditioning means during the opened condition of the rear hatch being done based on corrected sun radiation amount.

* * * * *